United States Patent Office 3,424,843
Patented Jan. 28, 1969

3,424,843
COMPOSITION AND METHODS FOR CONTROLLING HYPERTENSION WITH 2-AZIDOACETOPHENONE OXIME
Theodor Weil, New Brunswick, and Hugo Stange, Princeton, N.J., assignors to FMC Corporation, New York, N.Y., a corporation of Delaware
No Drawing. Filed Oct. 23, 1965, Ser. No. 504,064
U.S. Cl. 424—226         4 Claims
Int. Cl. A61k 25/00

ABSTRACT OF THE DISCLOSURE

The compound, 2-azidoacetophenone oxime, is a stable hypotensive agent that can be safely administered to animals for an extended period of time sufficient to lower blood pressure.

---

This invention relates to the control of blood pressure in mammals and aims to provide a new hypotensive composition and a new method of combating hypertension in mammals.

The prevalence and persistence of hypertension and the serious physical disorders that are associated therewith have prompted extensive searching for chemotherapeutic agents which can be safely administered over an extended period of time to reduce blood pressure, particularly diastolic pressure, without producing untoward toxic manifestations or deleterious side effects. It is highly desirable that a hypotensive agent exhibit, not only low toxicity and absence of side effects, but also long duration of activity and smoothness and stability of action so that the desired reduction of blood pressure may be achieved through the administration of substantially constant dosage levels of the drug which will continue to be effective over the longest possible intervals. The search for a hypotensive agent having such properties has not been entirely successful.

We have discovered that the compound 2-azidoacetophenone oxime is a stable hypotensive agent of very low toxicity which exhibits smooth and prolonged activity of a high order. This was surprising because various azides have been included among the compounds that have been tested for hypotensive activity. For instance, the use of sodium azide is well known but this compound is quite toxic. Different organic azides have also been tested in the past by others who have reported that they have found them to be ineffective or too fleeting in their action or of insufficient potency to permit their use as effective hypotensive agents. Hence, the organic azides could not have been regarded as a promising field within which a superior hypotensive agent might be found.

2-azidoacetophenone oxime is particularly noteworthy in the respects that it is effective on oral administration and moderate increases in the size of a non-toxic but effective dose thereof will result in a proportionate increase in the duration of hypotensive effect, but without an observable increase in toxic manifestation. The low order of toxicity of that compound has been established as follows:

Charles River male albino rats, weighing from 200 to 400 grams were used. The rats were divided into groups of 5 rats each and administered the test compound orally at logarithmic increments in a manner intended to bracket the 50 percent lethal dosage.

The compound was suspended in an aqueous dispersion of 1 percent methyl cellulose (Methocel) and administered at a constant volume of 2 ml./100 grams of body weight at all dosage levels.

All rats were fasted for 16 hours prior to administration of the compound.

All animals were observed for evidence of pharmacotoxic signs and mortality at periodic intervals immediately after administration and daily thereafter for a total period of 14 days.

Necropsy evaluations were made of all rats which succumbed during the observation period.

No lesions were observed at necropsy which could be attributed to an effect produced by the administration of the test compound.

Lesions not related to the compound included congestion, pinpoint hemorrhages and pneumonia in 4 of the 11 rats examined.

The acute oral $LD_{50}$ data appears in Table 1.

TABLE 1.—ACUTE ORAL $LD_{50}$ VALUES 2-AZIDO-ACETOPHENONE OXIME IN ALBINO RATS

| No. Died/No. Dosed Dosage Level (mg./kg.) | | | | | | | $LD_{50}$ and Confidence Limits (mg./kg.) |
|---|---|---|---|---|---|---|---|
| 215 | 316 | 464 | 681 | 1,000 | 1,470 | 2,150 | |
| 0/5 | 0/5 | 2/5 | 3/5 | 5/5 | | | 639 (382–1,070) |

To test the hypotensive activity of 2-azidoacetophenone oxime on intravenous administration, mean arterial blood pressure in pentobarbitalized (35 mg./kg.) normotensive mongrel dogs was recorded from the left or right cannulated femoral artery via a heparinized saline bridge to either a Bourdon photoelectric, or a Statham P23Db low volume displacement pressure transducer, which in turn was connected to an electronic recorder. The contralateral femoral vein was isolated and cannulated for injection of the test material and control substances.

A midline incision was made in the cervical area of the neck and both carotid arteries were exposed for occlusion. The right vagus nerve was divided and the peripheral stump passed through tubular platinum electrodes for stimulation. Respiration was recorded via an impedance pneumograph. Standard lead II electrocardiograms were periodically recorded throughout a given experiment. Heart rates were recorded by ausculation.

One-half hour was permitted to elapse after dividing the vagus nerve for the animal to recover from surgery and the blood pressure to stabilize. Prior to intravenous administration of the test compound at least two control responses were obtained from each of the following procedures:

(1) Acetylcholine chloride, 2 mcg./kg., intravenously administered.
(2) Histamine phosphate, 5 mcg./kg., intravenously administered.
(3) L-epinephrine bitartrate, 2 mg./kg., intravenously administered.
(4) Angiotensin II (hypertensin), 1 mcg./kg., intravenously administered.
(5) Peripheral vagal stimulation, 5–15 seconds.
(6) Bilateral carotid occulsion, 15–30 seconds.

The test compound was prepared for intravenous administration by dilution in polyethylene glycol (Carbowax 300) as necessary for each dosage level administered. Volumes administered did not exceed 2 ml. at any one given injection. Comparable volumes of Carbowax 300 without drug were administered at least once for control purposes in each experimental trial. The control series of injected chemicals and procedures was periodically applied after each administration of test material as long as an effect persisted from the test compound. The test materials were administered at various dosage levels to at least two dogs at each level in an attempt to produce a dose-response for each compound.

2-azidoacetophenone oxime reduced mean systemic blood pressures 15 to 55 percent of the control mean at dosages of 1 to 20 mg./kg. Duration of blood pressure decrease averaged 49 to 174 minutes at the dosages quoted. However, the duration of effect was greater at 1 mg./kg. than at 5 mg./kg. in these tests.

At 30 mg./kg. in one dog, the compound reduced blood pressure 71 percent for more than 4 hours.

The influence on the standard series of measurements seemed to be confined to a mild inhibition of the depressor responses to acetylcholine; mild inhibition to the pressor responses produced by bilateral carotid occlusion (BCO) and mild potentiation of epinephrine and angiotensin induced pressor responses.

Tachycardia (less than 25 percent) and bradypnea (50 percent) and in some dogs tachypnea (50 percent) was observed.

Standard lead II ERG's remained relatively unchanged. In one dog a diminution in height of the T wave was produced and a slight accentuation of the P wave also occurred in the same animal.

2-azidoacetophenone oxime appeared to lower both systolic and diastolic blood pressure in a dose-response fashion on intravenous administration.

TABLE 2.—BLOOD PRESSURE LOWERING EFFECTS

| Dog No. | Dose (mg./kg.) | Mean B.P. Control | Arterial (mm. Hg.) Fall | Percent Fall | Duration (min.) |
| --- | --- | --- | --- | --- | --- |
| 242 | 1 | 105 | −15 | 14 | 79 |
| 253 | 1 | 132 | −22 | 16 | 137 |
| Mean | | | −18 | 15 | 108 |
| 252 | 5 | 145 | −35 | 24 | 62 |
| 254 | 5 | 140 | −55 | 32 | 37 |
| Mean | | | −45 | 28 | 49 |
| 254 | 10 | 100 | −48 | 48 | 153 |
| 242 | 10 | 135 | −33 | 24 | 55 |
| Mean | | | −40 | 36 | 104 |
| 243 | 20 | 140 | −93 | 66 | 270 |
| 253 | 20 | 125 | −65 | 52 | 157 |
| 255 | 20 | 105 | −48 | 46 | 94 |
| Mean | | | −69 | 55 | 174 |
| 254 | 30 | 131 | −93 | 71 | >240 |

To test the hypotensive activity of 2-azidoacetophenone oxime on oral administration, normotensive mongrel beagle-type dogs of either sex weighing from 8 to 14 kg. were used. The dogs were lightly restrained in a canvas sling while systolic blood pressures were indirectly determined by the use of a Beckman FBR–2A electrical manometer, Beckman Infraton signal divider and a Sanborn single channel cardiovisette model 100.

As in standard clinical practice, an occluding cuff was attached to the shaved base of the dog's tail and inflated beyond the point of arterial collapse. As the cuff pressure was released the first appearance of arterial pulsation, or sound and pulsation, was taken as an index of systolic blood pressure. Pulsations were oscillographically recorded with the Sanborn Recorder.

An infraton microphone pickup was attached just below the occluding cuff directly over the middle coccygeal artery on the ventral surface of the tail. This instrument in effect replaces the stethoscope as used in conventional clinical practice. It transmits sound and pulse wave data directly to the Infraton Signal Divider. The occluding cuff is connected to the FBR–2A electrical manometer and is inflated by hand. Data from the pickup is selected by the signal divider and transmitted to the recorder.

An automatic, adjustable, linear pressure release valve in the FBR–2A manometer releases cuff pressure at any chosen rate and simultaneously transmits information on the changing cuff pressure levels to the recorder.

All of the dogs in this study were trained to remain perfectly still and relaxed while blood pressures were being measured.

2-azidoacetophenone oxime was administered orally in capsule form to 6 dogs each at dosage levels of 10 or 25 mg./kg. Another group of 6 dogs was administered 1-azidoacetophenone oxime in capsule form 1 hour after a subcutaneous dosage of 20 mg./kg. of the antiemetic Tigan®. A fourth group of 6 dogs was administered an oral dosage of 25 mg./kg. of 2-azidoacetophenone oxime which was immediately followed by an oral intubation of 100 ml. per animal of milk.

The test compound was diluted with granular lactose and placed in capsules for oral administration to dogs.

Dosages of 10 or 25 mg./kg. were used. Six dogs were used at each dosage level.

At 10 mg./kg. one dog in six emesed within one-half hour after administration of the compound. No other pharmacodynamic or toxic signs were observed which could be compound-related.

A significant decrease in the systolic blood pressure at this dosage level ($P < .01$) was observed 30 minutes after administration. The blood pressure was still lowered at 1 and 2 hours, but was returned toward preadministration control values, and was no longer significantly different from the initial control value. At 3 hours, the blood pressure had completely returned to the usual normal range.

At 25 mg./kg. 4-of-6 dogs vomited within one-half to one and one-half hours after the administration of test agent. No other adverse pharmacotoxic signs were seen. Undissolved compound was obviously present in the gastric contents.

A significant drop in systolic blood pressure was seen in this group at 30, 60 and 120 minutes after administration even though 4 of the 6 dogs vomited in this group. Blood pressures had returned to control values at 3 hours after administration.

Another group of 6 dogs was subcutaneously administered 20 mg./kg. of the antiemetic agent Tigan (Schallek, W., Heise, G., Keith, E., and Bagdon, R.: Pharmacol. Expl. Therap., 126, 3, 1959) one hour prior to the oral administration of 25 mg./kg. of the test agent. Four of the six dogs vomited approximately one and one-half hours after the administration of this compound. No significant change in blood pressure occurred in this group of dogs over a 4-hour period of measurement.

The results indicate that 2-azidoacetophenone oxime does not produce emesis by a central stimulation of the emetic chemoreceptor trigger zone, since Tigan effectively blocks substances acting by this mechanism. It is assumed from this evidence that the compound causes emesis by a direct irritation of the gastrointestinal tract.

Another group of 6 dogs was orally administered 25 mg./kg. of 2-azidoacetophenone oxime in capsule form, followed immediately by an intubation of 100 ml. of milk per animal. Experimentally in animals milk has proven effective in preventing emesis from compounds which act by a gastric irritating mechanism.

Two of the dogs in this group vomited a small portion of the administered milk approximately one hour after administration. The remaining four dogs retained the administered compound and milk.

Systolic blood pressures were lowered in this group over an 8-hour period of measurement. Blood pressures had not returned to the preadministration value at the 8th hour of measurement. Significant differences were recorded at ½, 1, 2, 3, 4, 5 and 8 hours after administration.

These results indicate that 2-azidoacetophenone oxime probably produced emesis by a gastric irritating mechanism, and that the compound, if retained, produces a potent and long lasting decrease in the blood pressure of dogs.

TABLE 3.—INDIRECT SYSTOLIC BLOOD PRESSURE CHANGES INDUCED BY ORAL DOSAGES OF 2-AZIDOACETOPHENONE OXIME IN NORMOTENSIVE MONGREL DOGS

| Dog No. | Blood Pressure (mm. Hg) | | | | | |
|---|---|---|---|---|---|---|
| | Control | Time (Hours) | | | | |
| | | ½ | 1 | 2 | 3 | 4 |
| 10 mg./kg.: | | | | | | |
| 1 | 125 | 92 | 97 | 110 | 130 | 126 |
| 14 | 147 | 114 | 118 | 143 | 145 | 146 |
| 13 | 124 | 113 | 98 | 119 | 132 | 129 |
| 12 | 137 | 115 | 133 | 139 | 142 | 141 |
| 4[1] | 138 | 103 | 144 | 128 | 144 | 141 |
| 6 | 141 | 116 | 135 | 131 | 131 | 140 |
| Mean | 135 | 109 | 121 | 128 | 137 | 137 |
| S.E | ±4 | ±4 | ±8 | ±5 | ±3 | ±3 |
| P | | <0.01 | NS | NS | NS | NS |
| 25 mg./kg.: | | | | | | |
| 1b | 129 | 88 | 89 | 110 | 133 | 133 |
| 14 | 139 | 117 | 83 | 110 | 131 | 138 |
| 13 | 134 | 125 | 98 | 95 | 133 | 135 |
| 12[1] | 114 | 84 | 120 | 114 | 120 | 123 |
| 4[3] | 132 | 138 | 125 | 127 | 130 | 134 |
| 6[2] | 149 | 84 | 100 | 119 | 145 | 146 |
| Mean | 133 | 106 | 103 | 113 | 132 | 135 |
| S.E | ±5 | ±10 | ±7 | ±4 | ±3 | ±3 |
| P | | <0.05 | <0.01 | <0.01 | NS | NS |

[1] Emesed within ½ hour after compound administration.
[2] Emesed within one hour after compound administration.
[3] Emesed within 1½ hours after compound administration.
NOTE.—S.E. Standard Error of the Mean; NS Not Significant; P Students' test of "t."

TABLE 3A.—INDIRECT SYSTOLIC BLOOD PRESSURE CHANGES INDUCED BY ORAL DOSAGES OF 2-AZIDOACETOPHENONE OXIME IN NORMOTENSIVE MONGREL DOGS.[1]

| Dog No. | Blood Pressure (mm. Hg) | | | | | | |
|---|---|---|---|---|---|---|---|
| | Control[2] | Control[3] | Time (Hours) | | | | |
| | | | ½ | 1 | 2 | 3 | 4 |
| 25 mg./kg.: | | | | | | | |
| 1[4] | 127 | 129 | 133 | 136 | 132 | 134 | 133 |
| 14 | 132 | 131 | 131 | 134 | 127 | 129 | 132 |
| 13 | 127 | 132 | 130 | 138 | 140 | 141 | 141 |
| 12[4] | 119 | 121 | 121 | 134 | 126 | 127 | 128 |
| 4[4] | 133 | 132 | 133 | 142 | 149 | 152 | 153 |
| 6[4] | 127 | 130 | 130 | 134 | 130 | 132 | 131 |
| Mean | 128 | 129 | 130 | 136 | 134 | 136 | 136 |
| S.E | ±3.0 | ±2.4 | ±2.4 | ±1.8 | ±5.4 | ±5.4 | ±5.4 |
| P | | NS | NS | NS | NS | NS | NS |

[1] All animals administered subcutaneously Tigan, 20 mg./kg., 1 hour prior to the oral administrations of test compound.
[2] Control prior to all treatment.
[3] Control 1 hour after Tigan administration and just prior to test compound administration.
[4] Emesed within 1½ hours after compound administration.
NOTE.—S.E. Standard Error of the Mean; NS Not significant; Students' Test of "t".

TABLE 3B.—INDIRECT SYSTOLIC BLOOD PRESSURE CHANGES INDUCED BY ORAL DOSAGES OF 2-AZIDOACETOPHENONE OXIME IN NORMOTENSIVE MONGREL DOGS.[1]

| Dog No. | Blood Pressure (mm. Hg) | | | | | | | | |
|---|---|---|---|---|---|---|---|---|---|
| | Control | Time (Hours) | | | | | | | |
| | | ½ | 1 | 2 | 3 | 4 | 5 | 6 | 7 | 8 |
| 25 mg./kg.: | | | | | | | | | | |
| 1 | 142 | 128 | 104 | 86 | 68 | 112 | 124 | 124 | 132 | 140 |
| 2 | 184 | 155 | 147 | 125 | 140 | 147 | 184 | 172 | 185 | 160 |
| 3 | 161 | 147 | 145 | 118 | 115 | 118 | 126 | 116 | 136 | 133 |
| 4 | 161 | 135 | 142 | 116 | 117 | 026 | 123 | 134 | 126 | 128 |
| 5[2] | 166 | 83 | 96 | 111 | 116 | 107 | 121 | 160 | 117 | 134 |
| 6 | 145 | 143 | 125 | 97 | 114 | 108 | 115 | 133 | 132 | 148 |
| Mean | 160 | 132 | 127 | 109 | 112 | 120 | 132 | 140 | 138 | 141 |
| S.E | ±6.2 | ±10.5 | ±9.0 | ±6.1 | ±9.4 | ±6.2 | ±10.5 | ±8.8 | ±9.8 | ±4.8 |
| P | | <0.05 | <0.01 | <0.001 | <0.001 | <0.001 | <0.05 | NS | NS | <0.05 |

[1] Dosages in all animals immediately followed by 100 ml./dog of milk.
[2] Moderate emesis at 1 hour after compound administration.
[3] Moderate emesis at 2 hours after compound administration.
NOTE.—S.E. Standard Error of the Mean; NS Not significant; P Students' Test of "t".

In order that our invention will be fully available to those skilled in the art, we will describe briefly our preferred method of preparing 2-azidoacetophenone oxime:

A mixture of 70 g. 2-chloroacetophenone, 100 g. hydroxylamine hydrochloride and enough methanol and water to make a clear solution was stirred overnight at room temperature. The reaction mixture was poured onto ice, the precipitate formed collected and dried in a vacuum dessicator over $CaCl_2$. On recrystallization from hexane 50 g. 2-chloroacetophenone oxime, M.P. 87–90°, was obtained. 12 g. 2-chloroacetophenone oxime and 6 g. sodium azide was suspended in 100 ml. ethanol and stirred overnight at room temperature. After addition of 10 ml. $H_2O$ and stirring for one additional hour, the mixture was poured into water. The precipitate was collected, filtered and dried. Recrystallization from hexane yielded 11 g. 2-azidoacetophenone oxime, M.P. 78–9°.

Calc.: N, 31.63; C, 54.22; H, 5.13. Found: N, 31.58; C, 54.98; H, 4.70.

The 2-azidoacetophenone oxime of this invention may be administered intravenously, orally, or as an inhalent or spray. For oral administration, it may be associated with a solid pharmaceutical vehicle in the form of a tablet, pill, powder, capsule or other dosage unit form which is suitable for oral administration. Suitable solid vehicles include lactose, cornstarch, microcrystalline cellulose, talc, stearic acid, magnesium stearate, gums and the like. Coated tablets or pills are particularly suitable. Capsules are also particularly suitable. Typical pharmaceutical capsule casings such as gelatin may be used.

2-azidoacetophenone oxime may also be administered in liquid form. For oral use, liquid emulsions or suspensions containing about 5–50% of the azide in water are suitable. Conventional emulsifying and suspending agents can be added as stabilizers. These compositions can also contain a small amount of ethanol which will partially dissolve the azide. Liquid fats are unsuitable as vehicles since the azides are highly soluble in these fats and apparently tend to remain dissolved in the chyle.

For intravenous injection or oral use, 2-azidoacetophenone oxime can be dissolved in polyethylene glycol (e.g., Carbowax 400), which may be diluted as desired, or some other pharmacologically inert vehicle in which it is soluble. For intravenous injection it may also be emulsified in an inert aqueous isotonic solution. 2-azidoacetophenone oxime concentrations of about 15–75% are suitable. It may also be administered by inhalation or nasal spraying but is normally not used in this manner because of the difficulty in controlling dosage. However, in acute situations where immediate reduction in blood pressure is necessary, inhalants and sprays are appropriate.

Selection of the proper dosage for correction of hypertension is determined by various factors such as the severity of the disease and the desired duration of effect.

What is claimed is:

1. The method of controlling hypertension in a mammal afflicted therewith which comprises periodically administering to said mammal an effective dosage of 2-azidoacetophenone oxime.

2. The method of controlling hypertension in a mammal afflicted therewith which comprises periodically administering orally to said mammal an effective dosage of 2-azidoacetophenone oxime.

3. The method of controlling hypertension in a mammal afflicted therewith which comprises periodically administering intravenously to said mammal an effective dosage of 2-azidoacetophenone oxime.

4. A hypotensive composition in the form of a tablet, capsule or injectable solution comprising an effective dosage of 2-azidoacetophenone oxime and a pharmaceutically acceptable carrier therefor.

References Cited

Chemical Abstracts, vol. 56, Subject Index Introduction, pp. 54N–55N, 1963.

Beilstein: Handbook of Organic Chemistry, 4th ed., first supplement, vol. 7, p. 154, 1931.

Forster et al.: Journal of the Chemical Society (London), vol. 97, pp. 140–142, 1910.

ALBERT T. MEYERS, *Primary Examiner.*

S. FRIEDMAN, *Assistant Examiner.*